3,150,101
ION EXCHANGE RESIN WITH SCINTILLATING PROPERTIES

Alvin H. Heimbuch, El Cerrito, Calif., assignor to the United States of America as represented by the United States Atomic Energy Commission
No Drawing. Filed Oct. 11, 1962, Ser. No. 230,015
3 Claims. (Cl. 252—301.2)

This invention relates generally to ion exchange resins and is directed in particular to the provision of a cation exchange resin having scintillating properties, and a method of making the same.

Ion exchange resins have been widely used in domestic and industrial water processing and for chemical analyses in commercial and government laboratories. Both anion and cation exchange resins have been used extensively in analytical radiochemistry; notably in the discovery and isolation of the transplutonium elements and in the identification of the missing rare earth promethium.

The detection as well as the separation of the radioactive nuclides is also an important field of radiochemistry and has heretofore involved the use of both liquid and solid scintillators as detectors for radioactive materials. Both polystyrene and polyvinyl-toluene have been used as plastic solvents for solid solution scintillators.

Inasmuch as plastic scintillators and ion exchange resins are both organic polymer products, both of which are useful analytical tools in the field of radiochemistry, it is apparent that it would be very advantageous to combine the properties of ion exchange and scintillation into a single dual purpose product. A particular advantage of such a product would be its fluorescent response to radioactive emanations when coupled to a photomultiplier tube. Such an arrangement would facilitate the preparation of samples for counting, since radioactive nuclides could be adsorbed and counted on the resin without further chemical operations.

Heretofore two approaches to the problem have been attempted. First, an attempt was made to introduce ion exchange groups by direct sulphonation on the surface of commercially available plastic phosphor beads. This method was unsuccessful since the number of exchange groups that could be introduced without destroying the bead was not practical. Also the sulfonated beads swelled considerably when in water. This was presumably due to the fact that the polymer was a linear molecule, i.e., not cross-linked.

In view of the failure of direct sulphonation of commercial plastic phosphor beads, attempts were made to coat the beads with an epidermal layer of a cross-linked polymer of styrene and divinylbenzene to serve as a base that could be sulphonated without dissolving in the sulphonating medium. However, attempts along these lines were also unsuccessful since a suitable solvent-monomer system could not be found which would yield a satisfactory layer or cross-linked polymer on the plastic beads.

The objects of this invention are to provide an ion exchange resin with scintillating properties and a method of making the same.

The foregoing objects are attained by first synthesizing a plastic phosphor bead having a cross-linked polymer matrix. This is accomplished by a suspension type polymerization process. Next the surface of the bead is sulphonated without dissolution or swelling of the bead. The resulting cation resin is a cross-linked polymer containing ionizing sulphonic groups ($-SO_3H$) chemically bound to the surface of the bead and fluorescent compounds dissolved in solid solution within the bead.

The resin is made by a suspension-type polymerization process as solid, spherical beads. The beads are made of polyvinyltoluene or polystyrene cross-linked with divinylbenzene and contained p-terphenyl and 1,4-bis-[2-(5-phenyl-oxazolyl)]-benzene (POPOP) dissolved in solid solution. The beads must be made by a suspension-type polymerization, since cross-linked polyvinyltoluene, or polystyrene is infusible once it is formed. Hence the phosphors must be dissolved in the monomers before the reaction is started. The most demanding consideration is to find a liquid suspension system which (a) does not interfere with the polymerization, (b) does not cause the bead to become opaque, (c) controls the bead diameter, (d) stabilizes the system so that the beads do not adhere during the sticky gelation period of the reaction, (e) does not quench the scintillation process even though it is dissolved or mechanically incorporated into the bead to the extent of a few parts per million. The most suitable solutions are dilute aqueous saline solutions containing either polyvinyl alcohol or gelatin maintained at a temperature of approximately 75–85° C. and a pH of 4.5 to 7.5 during the reaction.

Ionizing sulphonic groups ($-SO_3H$) are introduced on or near the surface of the beads by direct sulphonation in 5% fuming sulphuric acid.

The pulse height of the beads may be measured in a Lucite cup optically coupled to a photomultiplier tube. The signal from the photomultiplier tube in turn, is amplified and fed into a multichannel pulse-height analyzer.

The invention may be understood in greater detail from the following description of specific examples.

PREPARATION OF SCINTILLATING, CROSS-LINKED POLYMER BEADS

A number of samples of scintillating, cross-linked polymer beads having the composition listed in Table I were prepared in the following manner:

*Table I.—Bead Preparation Data*

| Sample No. | Organic phase | Suspension medium | Ratio of monomer/ water (w./v.) | pH | Temperature, ° C. | Remarks |
|---|---|---|---|---|---|---|
| 10-C | A+DPS | B+0.5% gelatin | 1:10 | 5 | 71 | White, fine, granular and spherical beads. |
| 10-D | A+TPB | B+0.3% gelatin | 1:10 | 5 | 75 | Off-white, granular beads, some clear. |
| 10-E | A+TPB | B+0.25% gelatin | 1:20 | 7 | 75 | Spherical beads, 0.1–3.0 mm. good clarity. |
| 10-F | A+DPS | B+0.2% gelatin | 1:20 | 4.5 | 90 | Clear, spherical beads 0.1–3.0 mm. slightly frosty surface. |
| 10-G | A+POPOP | ----do---- | 1:20 | 4.5 | 75 | Spherical beads, 0.1–3.0 mm. good clarity. |
| 10-H | A+POPOP* | B+0.3% gelatin | 1:20 | 6.0 | 85 | Clear, spherical beads, 0.1–3.0 mm. |
| 11-A | A+POPOP | B+0.2% gelatin | 1:10 | 6.5 | 85 | Do. |
| 12-A | A+DPS | ----do---- | 1:18 | 6.5 | 92 | Clear, spherical beads, very small, 0.01–0.2 mm. |
| 12-B | A+DPS | ----do---- | 1:20 | 6.5 | 91 | Clear, spherical and granular beads, 0.1–5.0 mm. |
| 12-C | A+POPOP | B+0.4% gelatin | 1:10 | 7.5 | 85 | Spherical beads, a few granular, good clarity, 0.1–5.0 mm. |

"A" is comprised of vinyltoluene and divinylbenzene (10%) in which is dissolved 3.5% p-terphenyl, 0.5% benzoyl peroxide and 0.5% mineral oil.
"B" is a 0.2% solution of NaCl in distilled water.
TPB=tetraphenylbutadiene, 0.03% the weight of the monomers.
DPS=diphenylstilbene, 0.1% the weight of the monomers.
POPOP=1,4-bis-[2-(5-phenyloxazolyl)] benzene, 0.1% the weight of the monomers.
*No mineral oil added.

The desired amount of water containing the suspension stabilizer was added to a Pyrex flask equipped with a mechanical stirrer and heated to 75° C. with stirring. The flask was flushed with high purity nitrogen for at least thirty minutes before the monomer-phosphor recipe was added. A slight positive pressure of nitrogen was maintained throughout the entire course of the reaction. An electric heating mantle was used to heat the reaction flask.

After the aqueous suspension medium had reached the desired temperature, the organic recipe was made up in an an Erlenmeyer flask under nitrogen. The phosphors and mineral oil were dissolved in the monomers at a temperature of 70 to 80° C., with intermittent, gentle swirling of the flask's contents. Benzoyl peroxide was added at 80 to 90° C. and the organic solution was heated to a temperature of 100–110° C. with frequent, manual swirling of the flask to avoid hot spots. At this point the recipe was carefully observed. Polymerization had started, and the heat of reaction added to that of the electric heater resulted in accelerating the reaction. If it proceeded too far the recipe would jell before it could be transferred to the Pyrex flask. There were three things which were observed to help prevent this when using a monomer mix of vinyltoluene and divinylbenzene in the ratio of 9:1 (w./w.). (1) The temperature rose more rapidly in the range of 95 to 110° C. (2) There was a visible vapor cloud which formed just above the surface of the liquid at the above stated temperature range. The phosphor monomer solution was transferred to the suspension medium within a minute after this cloud was observed. (3) After several runs were made one could visually observe an increase in viscosity—whether the agitation was done by a manual swirling motion of the flask or by a mechanical stirrer.

When the liquid phosphor reached the desired stage, it was poured directly into the suspension medium with the mechanical stirrer running. The speed of the stirrer was adjusted so that it was just fast enough to break up the organic liquid phase into droplets which appeared to be in the 0.5 mm. diameter range. A glass stirring rod with a two-bladed propeller, each blade about 1 inch in length, turning at 200 to 400 r.p.m. was sufficient to do this. Polymerization generally proceeded far enough so that bead diameter was well determined within the first hour.

The period during which the beads turned from a sticky, soft jell to a firm non-adhesive bead was a critical period. This generally occurred between the first and third hours. If the beads showed a tendency to cluster, the stirring rate was increased—which helped to keep the clusters from becoming too large when stability of the suspension was a borderline case. Vigorous stirring did not break up small clusters since they fused into one another and polymerized.

The temperature was kept at about 80 C. for the first 16 hours. After this time the suspension would often appear a milky white and frequently a white, flocculent precipitate obtained. For this reason the reaction mixture was allowed to cool to 50° C. or less and the beads was filtered and washed with distilled water. The beads were then resuspended in 1% NaCl solution under nitrogen, and the mixture was heated to 80° C. with constant stirring. The reaction was continued for another 56 hours; during the last 24 hours the temperature was maintained at 90° C.

After the suspension was cooled, the beads were filtered and washed several times with distilled water; the beads were then dried and sized by use of graded mesh sieves.

The examples listed in Table I all relate to beads containing a polymer matrix of polyvinyltoluene cross-linked with divinylbenzene. It is also possible to make cross-linked beads in which styrene is used in place of vinyltoluene. However, vinyltoluene is preferred since it gives a greater pulse height than styrene.

All monomers used were vacuum distilled and stored under nitrogen at 5° C. until used.

The phosphors used were all of scintillation grade. p-Terphenyl was used almost exclusively as the primary solute phosphor. The main wave band shifter, or secondary solute, used was 1.4 bis-[2-(5-phenyloxazolyl)]-benzene or POPOP. Tetraphenylbutadiene (TPB) and p,p'-diphenylstilbene (DPS) were also used as secondary solutes. p-Terphenyl was used at a level of 3.5% of the weight of monomers in the recipe, and POPOP was used at the 0.1% level.

Mineral oil (paraffin oil) was used in the organic recipe to enhance the optical clarity of the bead. It was obtained as a white, USP grade oil and used at a 0.5% weight concentration.

Aqueous suspension media have been the only satisfactory liquids found suitable for this procedure. Most organic liquids either interfere in the polymerization or dissolve the monomers.

Distilled water was used in all aqueous suspensions tried. Sodium chloride of a reagent grade was the only salt employed and was added to the water after a stabilizer had first been dissolved. Purified gelatin was used as one of the stabilizers. The pH of the gelatin solutions was adjusted with $NH_4OH$. Two different grades of polyvinyl alcohol were also used as stablizers. One was a 98% hydrolyzed grade and a second was a 99.7% hydrolyzed grade; both were obtained from commercial sources. Polyvinyl-alcohol was dissolved by heating to 94° C. with vigorous stirring for one-half hour.

PREPARATION OF SCINTILLATING ION EXCHANGE BEADS

Cross-linked phosphor beads, prepared as described above, were successfully sulfonated to produce scintillating ion-exchange beads. Either of two sulfonating agents was used. One consisted of a 10% chlorosulfonic acid medium formed by diluting 99% purity chlorosulfonic acid with a suitable amount of reagent grade, 96% sulfuric acid. A second sulfonating agent was made by adding 65% fuming sulfuric acid to concentrated sulfuric acid until a 5% fuming sulfuric acid solution was obtained. Silver sulfate catalyst was dissolved in this acid at a level of 1% by weight.

Samples of beads were placed in glass-stoppered Erlenmeyer flasks containing an excess of sulfonating agent. The flasks were agitated intermittently by a manual swirling motion. The temperature and time of reaction were varied. The reaction was stopped by pouring the contents of the flasks on to cracked ice. The beads were collected in a fritted glass filter and washed sequentially with water, concentrated $NH_4OH$, water, 6 N $HNO_3$ and water.

The main objective of sulfonation was to introduce a practical number of sulfonic groups on or near the surface of the bead with a minimum loss in pulse height. The development of a yellow color was indicative of pulse height reduction. Five percent fuming sulfuric acid containing 1% silver sulfate catalyst degraded the bead less than did 10% chlorosulfonic acid at room temperature, 0° C. and 5° C. For best results the beads were introduced into the sulfonating medium at 0° C. and then placed in a refrigerator at 5° C. for 48 hours. The reaction mixture was shaken intermittently every 1 or 2 hours during the day. After 48 hours the mixture was allowed to come to room temperature. Aliquots of the beads were taken and measured for ion exchange capacity at intermittent intervals.

When the desired capacity was reached or the allowable reduction in pulse height, the beads were poured onto crushed ice to stop the reaction. An exchange capacity of 0.1 milliequivalent per gram of beads was attained. However, it was preferred to stop the reaction when an exchange capacity in the range 0.01 to 0.05 milliequivalent per gram was reached, in order not to unduly reduce the pulse height of the beads.

TESTING THE BEADS

A multichannel pulse-height analyzer was used to measure the light output of beads in response to alpha, beta and gamma radiation, and counting efficiencies of the beads were determined with respect to a number of radioactive nuclides.

Cations of alpha and beta emitting nuclides were adsorbed on 1 gram samples of beads in small ion exchange columns using the same chemical conditions as for commercial, sulfonic type, cation exchange resins. The beads were then transferred quantitatively with 5 ml. of water to a Lucite cup optically connected with a photomultiplier tube and counted. Aluminum foil was folded over the cup to increase light collection. The signal from the tube was passed through a linear amplifier into a multichannel pulse-height analyzer.

The following examples illustrate the procedures used for determining the counting efficiency of the beads for $Sr^{90}$ and for $Sr^{90}+Y^{90}$, respectively:

Example 1

A solution of 0.05 molar EDTA (ethylenediamine tetraacedic acid) at pH 5.5 containing carrier free $Sr^{90}$ in equilibrium with $Y^{90}$ was passed through 1 gram of beads in a column previously equilibrated with EDTA at pH 5.5. The beads were sulfonated beads of 10% cross-linked PVT (polyvinyltoluene) containing p-terphenyl and 1,4 - bis-[2-(5-phenyloxazolyl)] - benzene, referred to as POPOP. The beads had an ion exchange capacity previously determined to be 0.02 meq./gr.

The column was washed with 5 ml. of 0.05 molar EDTA to remove all trace of $Y^{90}$, transferred to the Lucite cup with 5 ml. of water and counted. After counting, the $Sr^{90}$ was eluted from the beads with 6 N $HNO_3$, and radiochemistry was performed to determine disintegrations per minute (d.p.m.) of $Sr^{90}$ adsorbed on the beads. From this data the counting efficiency was calculated as follows:

| Isotope | D.p.m., on resin | Background, d.p.m. | Net c.p.m. | Counting efficiency, percent |
|---|---|---|---|---|
| $Sr^{90}$ | 13,425 | 50 | 6,950 | 51 |

Example 2

An aliquot of carrier free $Sr^{90}$, in equilibrium with $Y^{90}$ from a standardized solution was added to dilute $HNO_3$ at pH 2 and adsorbed on 1 gram of beads as in Example 1. The total d.p.m. for the $Sr^{90}+Y^{90}$ adsorbed on the beads was determined by radiochemical means and compared with the counts per minute (c.p.m.) of the multichannel pulse height analyzer with the following result:

| Isotope | D.p.m., on resin | Background, d.p.m. | Net c.p.m. | Counting efficiency, percent |
|---|---|---|---|---|
| $Sr^{90}+Y^{90}$ | 33,760 | 50 | 20,850 | 62 |

Example 3

It has been reported that $Sr^{90}$ is completely adsorbed on a sulfonic cation exchange resin from an EDTA solution at pH 5.5 in the presence of excess Ca and Mg. The Y daughter, however, forms a very stable complex with EDTA and passes through the resin. This method was adopted to determine whether $Sr^{90}$ could be removed from spiked tap water.

Three grams of beads as in Examples 1 and 2 were placed in an ion exchange column and equilibrated with 0.05 molar EDTA at pH 5.5. Three liters of tap water containing a total of 2.4 milliequivalents of Ca plus Mg were spiked with $Sr^{90}$ carrier free, at a level of 0.47 d.p.m./ml. and made basic to pH 8.5 with NaOH. The hardness of the water was previously determined and twice the amount of EDTA needed to complex all the ions in the water was added. The water hardness was 60 p.p.m. calculated as $CaCO_3$. The water was heated to 70° C. for 1 hour, and the pH was adjusted to 5.4 with acetic acid after the solution cooled to room temperature. It was then passed through the column at a rate of 5 to 10 ml. per minute. Immediately after the water had passed through the column, the beads were washed with 5 ml. of EDTA solution at pH 5.3, transferred to the Lucite cup with 5 ml. of water and counted with the following result:

| Isotope | D.p.m., on resin | Net c.p.m. | Counting efficiency, percent |
|---|---|---|---|
| $Sr^{90}$ | 380 | 200 | 53 |

Other nuclides that have been successfully counted using the beads of the present invention include $Pu^{239}$, $Po^{210}$, and $Am^{241}$, which were counted with an efficiency of approximately 30, 40 and over 40 percent respectively. A counting efficiency of 12 percent was obtained for $Ni^{63}$ and 60 percent for $Tl^{204}$ using a liquid scintillation counter.

It has been found that the pulse height of the beads drops off rapidly as the diameter of the beads decreases below about 0.25 mm. Both the pulse height and count rate increase as the bead diameter increases. However, if the diameter of a bead is doubled, the surface area is halved, which decreases the surface exchange capacity. A useful diameter for the beads, when used in a bed 2 mm. deep, is between 0.25 and 0.7 mm.

While an exchange capacity of 0.1 milliequivalent per gram of beads has been attained using the method of this invention, the pulse height of the beads is decreased as the exchange capacity is increased. An exchange capacity which does not unduly reduce the pulse height has been found to lie between about 0.01 and 0.05 milliequivalent per gram.

While the invention has been described in connection with the introduction of cationic exchange groups by sulfonation of cross-linked phosphor beads, it is to be understood that anionic groups can also be introduced by chloromethylation followed by amination. It is also to be understood that an aromatic vinyl hydrocarbon other than styrene or vinyltoluene can be used, i.e., dimethyl— or diethyl—or methoxystyrene, as long as it does not contain a light quenching substituent such as $—NO_2$. Also divinylbenzene can be replaced by aromatic divinyl hydrocarbons such as divinylxylene or divinylnaphthalene.

It will be seen that the present invention provides a scintillating ion exchange material in the form of spheroidal beads which adsorb ions from aqueous solutions and fluoresce in response to radioactive emanations from any radioactive ionic species that may be adsorbed. The emitted light is of a wavelength which activates a photomultiplier tube. Thus, radioactive isotopes can readily be counted by coupling the resin on which they are adsorbed to a photomultiplier tube and pulse counter. The beads may be used to adsorb ions from aqueous solution in the same manner as commercial water softeners. The present invention thus provides both a new and useful product for analysis of drinking water, clinical tracer work, and the like, together with a method of making the same.

I claim:
1. A scintillating cation exchange resin consisting of
  (a) a bead of a polymer selected from the group consisting of polyvinyltoluene and polystyrene; said polymer being cross linked with divinyl benzene, the polymer being present in amounts ranging from about 90 to about 98 percent by weight based on the total weight of the cross linked copolymer, the divinyl- benzene being present in amounts ranging from about 2 to about 10 percent by weight based upon the total weight of the cross linked copolymer, (b) p-terphenyl being in solid solution with the cross linked copolymer in an amount equal to about 3.5 percent by weight based on the total weight of the cross linked copolymer, (c) a material selected from the group consisting of diphenylstilbene, tetraphenylbutadiene, and 1,4 bis-[2-(5-phenyloxazolyl)]-benzene being in solid solution with the cross linked copolymer in an amount equal to about 0.1, 0.3 and 0.1 percent by weight respectively, based on the total weight of the cross linked copolymer, (d) sulphonic groups being chemically bonded to the cross linked polymer located on the surface of the bead in an amount sufficient to give the bead an ion exchange capacity ranging between from about 0.01 to about 0.1 milliequivalents per gram of bead.

2. A resin in accordance with claim 1 wherein said polymer is polyvinyltoluene.

3. The method of making scintillating ion exchange beads that consists in the steps of:

(a) forming an organic phase consisting of approximately 90% by weight vinyltoluene and 10% divinylbenzene monomers in which is dissolved p-terphenyl in an amount equal to about 3.5% by weight of the monomers and a material selected from the group consisting of diphenylstilbene, tetraphenylbutadiene and 1,4 bis-[2-(5-phenyloxazolyl)]-benzene in amounts equal respectively to 0.1%, 0.03% and 0.1% by weight of the monomers.

(b) forming a suspension medium consisting of a 0.2% NaCl solution in distilled water containing between 0.2% to 0.5% gelatin, (c) heating and stirring the organic phase to a temperature of approximately 100°–110° C. to initiate polymerization, and then (d) pouring the organic phase into the suspension medium and stirring, to form cross-linked beads of polyvinyltoluene and divinylbenzene having p-terphenyl and said material in solid solution therein, and (e) sulfonating said beads to introduce ion exchange sulfonic groups on the surface thereof to produce an ion exchange resin having scintillating properties.

References Cited in the file of this patent
UNITED STATES PATENTS

| | | |
|---|---|---|
| 2,650,309 | Webb et al. | Aug. 25, 1953 |
| 2,985,593 | Broderick et al. | May 23, 1961 |

OTHER REFERENCES

Osborn: "Synthetic Ion-Exchangers," Second Edition, Chapman and Hall Ltd., London, 1961, pages 20 and 32.